US007809200B2

(12) United States Patent
Aguilar

(10) Patent No.: US 7,809,200 B2
(45) Date of Patent: Oct. 5, 2010

(54) DYNAMIC RANGE COMPRESSION OF HIGH DYNAMIC RANGE IMAGERY

(75) Inventor: Mario Aguilar, Cary, NC (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 894 days.

(21) Appl. No.: 11/599,091

(22) Filed: Nov. 14, 2006

(65) Prior Publication Data
US 2007/0183677 A1 Aug. 9, 2007

Related U.S. Application Data

(60) Provisional application No. 60/597,068, filed on Nov. 15, 2005, provisional application No. 60/765,441, filed on Feb. 3, 2006.

(51) Int. Cl.
*G06K 9/36* (2006.01)
*G06K 9/64* (2006.01)
*G06K 15/02* (2006.01)

(52) U.S. Cl. .................. 382/232; 382/279; 358/1.2
(58) Field of Classification Search ............... 382/232, 382/274, 254, 276, 279, 282, 298–300, 312; 348/272, 294, 340, 373; 358/1.2, 3.24, 513, 358/521, 528
See application file for complete search history.

(56) References Cited

U.S. PATENT DOCUMENTS

| 5,880,777 | A * | 3/1999 | Savoye et al. | 348/217.1 |
| 6,489,992 | B2 * | 12/2002 | Savoye | 348/340 |
| 7,206,459 | B2 * | 4/2007 | Berkner et al. | 382/251 |
| 7,433,514 | B2 * | 10/2008 | Sloan | 382/167 |

* cited by examiner

*Primary Examiner*—Kanji Patel
(74) *Attorney, Agent, or Firm*—Eric A. Gifford

(57) ABSTRACT

An improved apparatus and method adaptively compresses the dynamic range of an image from a sensor by rescaling the value of every pixel to fit within the dynamic range of a low dynamic range display while preserving local image contrast and global scene appearance.

20 Claims, 5 Drawing Sheets

Dataflow for ADRC

(Adaptive Dynamic Range Compression)

Local High-Frequency Boost/Enhancement

Dynamic range remapping to target bit-depth

Dataflow for DRMap

FIG. 3 hfbImg 42
(output from previous stage)

44 Find mean and standard deviation mean 46 std 48

50 Logistic Remapping outImg 52
(final image)

DRMap

LHFBoost

IMADRC

Process: Compute Logistic Remap

FIG. 4

- Parameters:
  - in
    - hfbImg: image produced by LHFBoost stage
    - S: steepness of logistic function
    - mean, std_dev: mean and standard deviation of hfbImg
    - maxVal: Target dynamic range (e.g. 255)
  - Out
    - outImg (final image)

- Description:
  - for each pixel $i$, a remapped value is defined as:

$$outImg_i = \frac{maxVal}{1 + e^{-S(hfbImg_i - mean)/std\_dev}}$$

Logistic Remapping

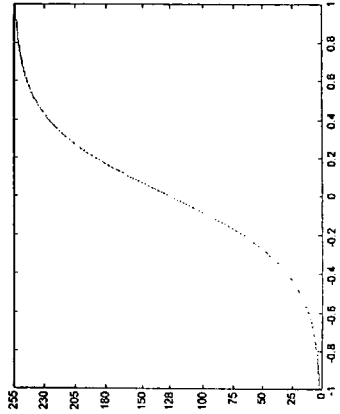
FIG. 5

DYNAMIC RANGE COMPRESSION OF HIGH DYNAMIC RANGE IMAGERY

CROSS REFERENCE TO RELATED APPLICATIONS

This application relates to Provisional Application No. 60/597,068, entitled "Enhancement, Fusion, and Visualization of Third Generation FPA Imagery," of Mario Aguilar, filed Nov. 15, 2005.

This application also relates to Provisional Application No. 60/765,441, entitled "Multi-scale color fusion method," of Mario Aguilar filed Feb. 3, 2006.

This application also relates to application Ser. No. 11/599,092, entitled "MULTI-SCALE IMAGE FUSION," of Mario Aguilar filed on even date herewith.

Applicant hereby incorporates by reference the entire contents of these three applications into this application.

TECHNICAL FIELD

This disclosure relates to imaging. More particularly, this disclosure relates to adaptive compression of high dynamic range sensor images for display on lower dynamic range displays.

BACKGROUND

Many imaging sensors digitize wide dynamic range images using a large number of bits per pixel. Most displays of reasonable cost, however, are only able to handle a lower number of bits per pixel. For example, many thermal infrared sensors digitize wide dynamic range images using 12 to 16 bits per pixel. The data produced by these infrared sensors cannot be displayed on typical computer monitors that can handle only 8 bits per pixel. Thus, there is a need for a way to display the wide dynamic range images on a lower dynamic range displays.

Waxman et al. U.S. Pat. No. 5,909,244 refers to an adaptive dynamic range remapping apparatus. The remapping done by the apparatus of the Waxman patent uses a contrast enhancement technique based only on local image characteristics and a constant global measure of scene brightness. This is unsatisfactory because the contrast enhancement does not account for significant brightness level differences throughout a scene.

SUMMARY

This need for an improved dynamic range compression arrangement is met by an improved apparatus and method for adaptively compressing the dynamic range of an image from the sensor by rescaling the value of every pixel to fit within the dynamic range of the display while preserving local image contrast and global scene appearance. The apparatus and method of this invention computes local statistics in conjunction with more global adaptive measures to effectively display imagery such as infrared imagery. A key idea is to use local operators at each pixel to measure both local image characteristics and more global adaptive scene measures to rescale the value of the corresponding pixel. Apparatus and methods in accordance with this invention strike an ideal balance between substantial compression and preservation of information.

BRIEF DESCRIPTION OF THE DRAWINGS

FIG. 3 is a block diagram of the dynamic range remap circuit of FIG. 1.

FIG. 4 is a specification of the logistic remapping circuit of FIG. 3.

FIG. 5 is a graph of the sigmoid function used to map high dynamic range input pixels to a lower dynamic range output display.

DETAILED DESCRIPTION

Figure 1:
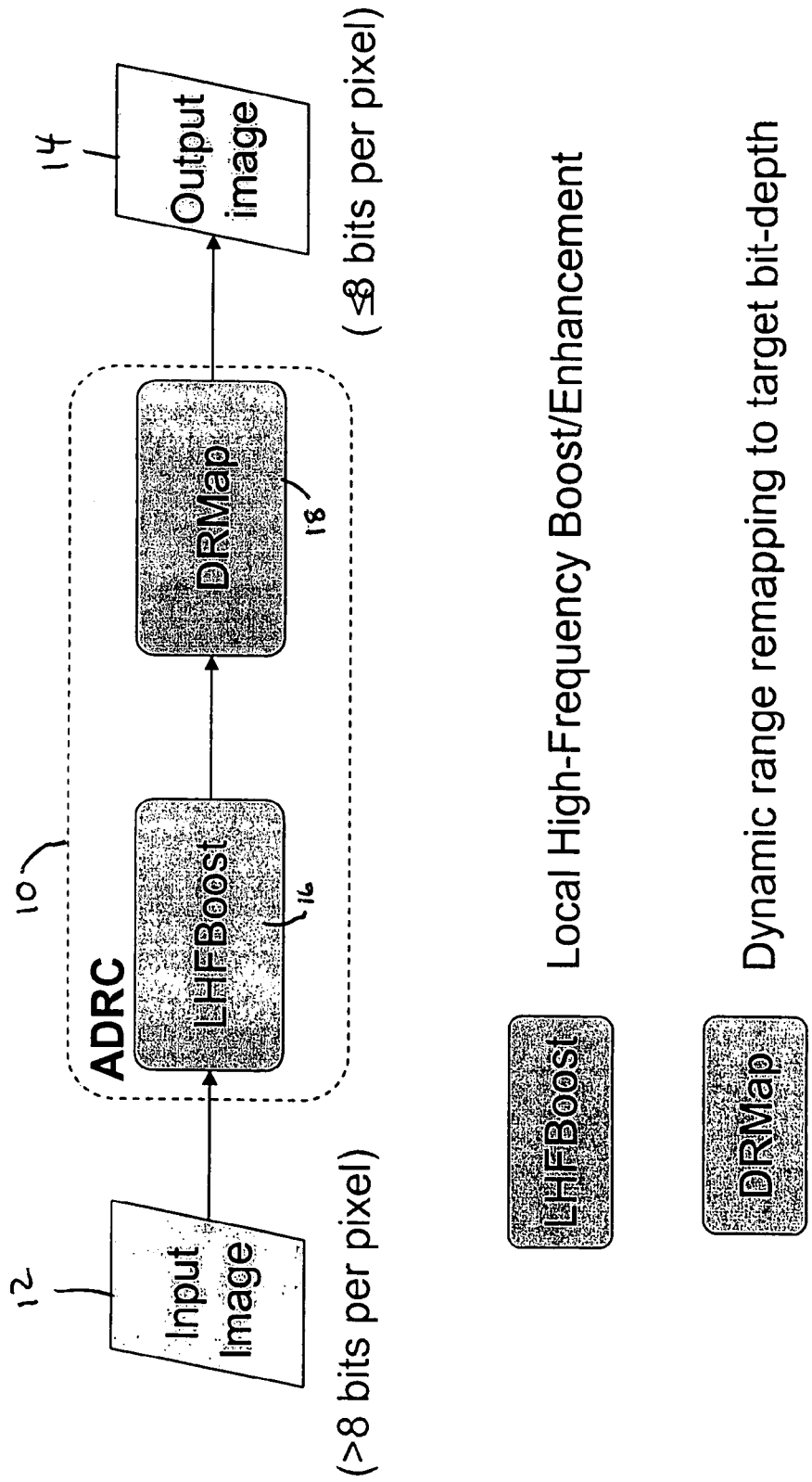
FIG. 1 is high level block diagram of one example of the invention.

FIG. 1 shows one example of an adaptive dynamic range compression apparatus in accordance with the invention. The apparatus of FIG. 1 includes an adaptive dynamic range compression (ADRC) processor 10 that receives a high dynamic range input image stored in a register or other storage element 12. The ADRC processor 10 produces a low dynamic range output image stored in a register or other storage element 14. The high dynamic range input image in register 12 is composed of a plurality of pixel values each represented by a relatively high number of bits, such as a number of bits greater than eight. The low dynamic range output image in register 14 also is composed of a plurality of pixel values, but each pixel value in the output image is represented by a relatively low number of bits smaller than the number of bits used to represent pixel values of the input image. For example, the number of bits in the output image may be eight or less. The ADRC processor 10 is comprised of a local high frequency boost/enhancement circuit 16 in series with a dynamic range remap circuit 18 between the input image register 12 and the output image register 14.

Figure 2:
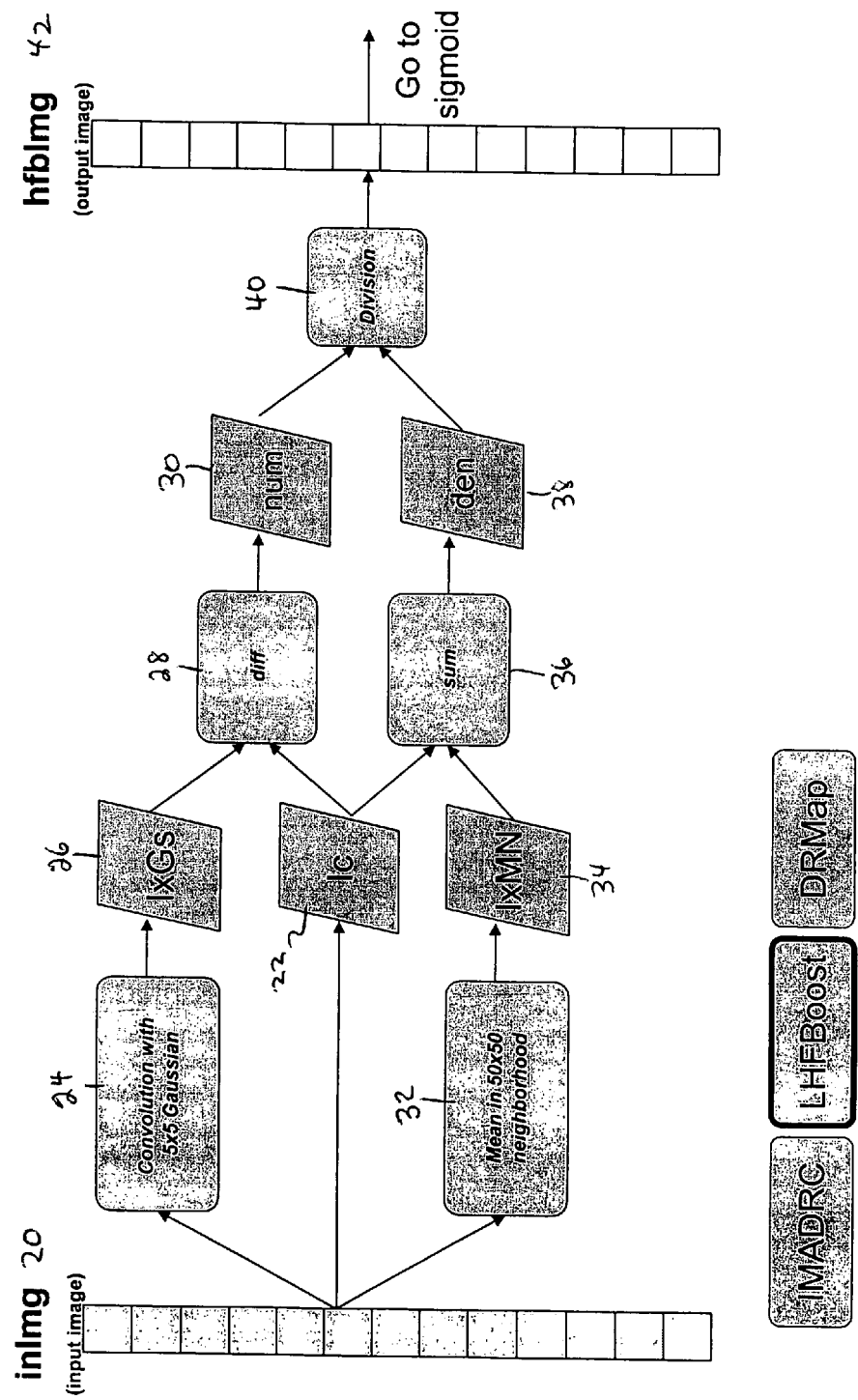
FIG. 2 is a block diagram of the high frequency boost circuit of FIG. 1.

FIG. 2 shows the details of the boost circuit 16. The boost circuit 16 has three main components, a center portion, a surround portion, and a normalization portion. In the center portion, each pixel value of the image 20 from register 12 is entered into a block 22. In the surround portion, each pixel value of the image 20 and pixel values in an N×N vicinity around each such pixel value undergo convolution with an N×N Gaussian operator centered on the input pixel in block 24. The result of the operation of block 24 is stored in block 26. The difference between the contents of blocks 22 and 26 is computed in block 28. The result of the computation in block 28 is a difference of Gaussians value (the content of block 22 is essentially a convolution of the image 20 with a one pixel Gaussian operator) which is stored in block 30. In the normalization portion, block 32 computes the mean of the pixel values in the image 20 in a P×P region around each pixel value sent to the center and surround portions of the boost circuit 16. The size of the P×P region preferably is larger than the size of the N×N region, but smaller than the entire image. The result of the computation performed by block 32 is stored in register 34. The contents of the registers 22 and 34 are summed together in block 36 to produce a normalization value which is stored in register 38. The difference of Gaussians value in register 30 is divided by the normalization value in register 38 in block 40. The output of block 40 is the output image 42 of the boost circuit 16 sent to the dynamic range map circuit 18 in FIG. 1.

The size of the Gaussian operator in the center portion of the boost circuit 16 is smaller than the size of the Gaussian operator used in the surround portion of the boost circuit 16; the region over which the block 32 measures the mean value of the input image is larger than the Gaussian operator used by the surround portion of the circuit 16. For example, the size of the Gaussian used in the center portion is one pixel, the size of the Gaussian used in the surround portion is a 5×5 pixel matrix centered on each pixel in the input image, and the mean is computed in a 50×50 neighborhood of each pixel in the input image.

The image 42 is fed to a block 44 in the dynamic range map circuit 18 shown in detail in FIG. 3. Block 44 computes the mean and standard deviation of the image 42. The block 44 stores the mean in block 46 and the standard deviation in block 48. A logistic remapping circuit 50 receives the contents of blocks 46 and 48 and remaps the image 42 to an output image 52 of the ADRC processor 10.

The logistic remap circuit 50 operates in accordance with FIG. 4. The circuit 50 receives the image produced by the boost circuit 16, a steepness parameter S, the mean and standard deviation std_dev values from blocks 46 and 48, and a target dynamic range value maxValue, and produces an output image 52 where, for each pixel i, the remapped value is defined as: $outImg=(maxVal)/1+e^{-S(hfbImg-mean)std\_dev}_i$. A graphical depiction of the transfer function of the logistical remapping circuit 50 is shown in FIG. 5.

Figure 6:
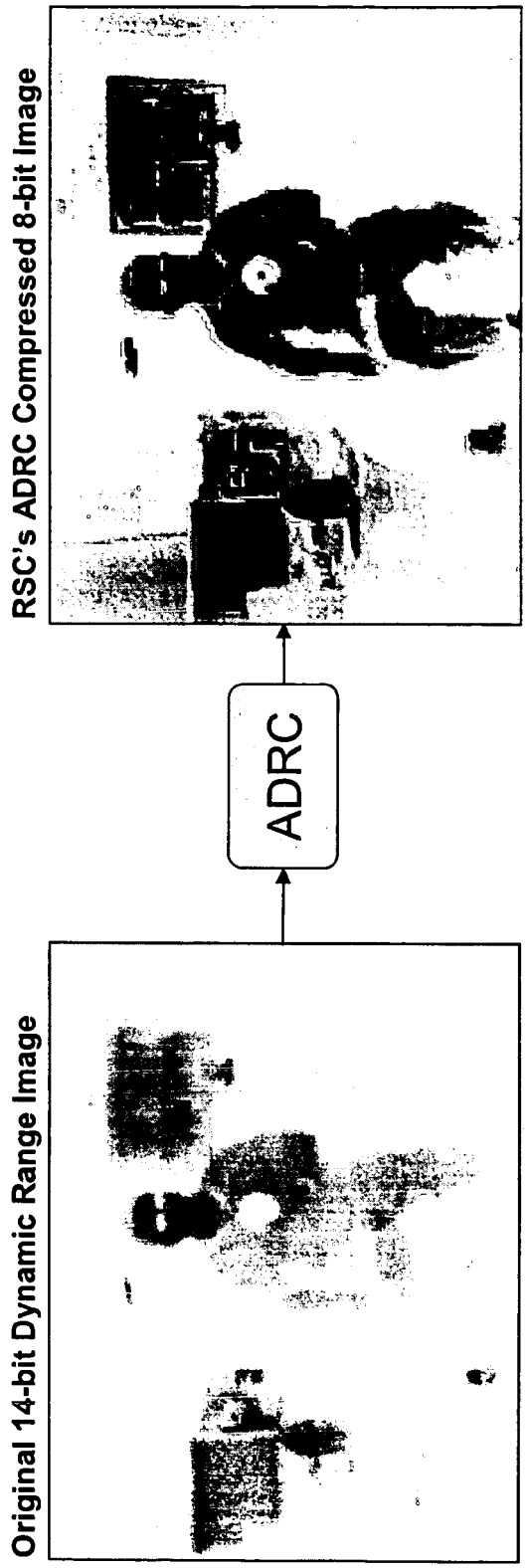
FIG. 6 is an illustrative example of an image produced by this invention.

The apparatus described above is improved apparatus that adaptively compresses the dynamic range of an image from a sensor by rescaling the value of every pixel to fit within the dynamic range of a low dynamic range display while preserving local image contrast and global scene appearance. A comparative example of the results achievable with this invention are shown in FIG. 6 which shows compression of a high dynamic range 14-bit thermal infrared image to a lower dynamic range 8-bit compressed image.

This invention has a wide variety of potential uses beyond thermal infrared imaging, including visual imaging, such the visual imaging used in still digital cameras. The invention may also be applied mammograms, MRI's, CAT scans, X-ray imaging, weather radar, sonar, or any other imaging involving the production of high dynamic range images that have to be displayed on low dynamic range displays.

The Title, Technical Field, Background, Summary, Brief Description of the Drawings, Detailed Description, and Abstract are meant to illustrate the preferred embodiments of the invention and are not in any way intended to limit the scope of the invention. The scope of the invention is solely defined and limited by the claims set forth below.

The invention claimed is:

1. An adaptive dynamic range compression apparatus, comprising:
   (a) a high frequency boost circuit that receives an input image comprising a plurality of input pixels, each of the input pixels being represented by a pixel value having a first predetermined first number of bits, the high frequency boost circuit producing an output image comprising a plurality of output pixels as a function of:
      (i) a first region of the input image neighboring each input pixel, the first region having a first area,
      (ii) a second region of the input image neighboring each pixel, the second region having a second area larger than the first area, and
      (iii) a third region of the input image neighboring each pixel, the third region having a third area larger than the second area, but smaller than the entire image; and
   (b) a dynamic range mapping circuit that receives the output image produced by the high frequency boost circuit and maps the output image to a target image comprising a plurality of target pixels, each of the target pixels being represented by a pixel value having a predetermined second number of bits, the second number of bits being less than the first number of bits.

2. The apparatus of claim 1, in which the dynamic range mapping circuit maps the output image to the target image based on a statistical function of pixel values in the entire image.

3. The apparatus of claim 1, in which the high frequency boost circuit produces an output image as a function of a statistical function of pixel values in the third region of the input image.

4. The apparatus of claim 3, in which the statistical function is the mean of pixel values in the third region of the input image.

5. The apparatus of claim 1, in which the high frequency boost circuit produces an output image as a function of:
   (a) each input pixel;
   (b) a convolution with a local distribution of each input pixel and neighboring input pixels in the second region of the input image and
   (c) a statistical function of pixel values in the third region of the input image wherein the boost circuit produces the output image as the difference of each input pixel and the convolution with the local distribution, said difference normalized by the sum of each input pixel and the statistical function of pixel values in the third region for each input pixel.

6. The apparatus of claim 5, in which the local distribution is a Gaussian distribution and the statistical function is the mean of pixel values in the third region of the input image, said mean adapting with local image characteristics in the third region.

7. A method of adaptively compressing the dynamic range of an image having a plurality of pixels, each of the pixels being represented by a pixel value having a first predetermined first number of bits, comprising the steps of:
   convolving each pixel of the image and a first region of the image around each pixel with a local operator to produce a processed pixel value, said first region being larger than each pixel;
   adaptively normalizing the processed pixel value based on a an adaptive mean value in a second region of the image around each pixel to produce an output image, the second region being larger than the first region, but smaller than the entire image; and
   mapping the output image to a target image comprising a plurality of target pixels, each of the target pixels being represented by a pixel value having a predetermined second number of bits, the second number of bits being less than the first number of bits.

8. The method of claim 7, wherein the processed pixel value is adaptively normalized based on a sum of the adaptive mean value in the second region and a function of pixels in a third region, the third region being smaller than the first region.

9. The method of claim 7, wherein the processed pixel value is a difference between the function of pixels in the third region and the convolution of each pixel in the first region with the local operator.

10. The method of claim 7, wherein the third region is each said pixel.

11. The method of claim 7, wherein the third region is larger than each said pixel and said function is a convolution of each pixel in the third region by the local operator.

12. A method of adaptively compressing the dynamic range of an image having a plurality of pixels, comprising the steps of:
   convolving each pixel of the image and a region of the image around each pixel with a local distribution to produce a first pixel value;

convolving each pixel of the image and a surround region of the image around each pixel with a local distribution to produce a second pixel value, said surround region being larger than the center region;

differencing the first and second pixel values to produce a processed pixel value;

processing each pixel of the image and a normalization region of the image around each pixel with a statistical function to produce a global adaptive scene measure for each pixel, said normalization region being larger than the surround region, but smaller than the entire image;

summing the first pixel value and the global adaptive scene measure to produce a normalization pixel value for each pixel; and adaptively normalizing each processed pixel value based on its normalization value to produce an output image.

13. The method of claim 12, wherein the center region is each said pixel and said first pixel value is the pixel value.

14. The method of claim 12, wherein the center region is larger than each said pixel value.

15. The method of claim 12, wherein the statistical function is the mean of pixel values in the normalization region, said mean adapting with each said pixel and its normalization region.

16. The method of claim 12, further comprising:

mapping the output image based on a statistical function of pixel values in the entire image to a target image comprising a plurality of target pixels, each of the target pixels being represented by a pixel value having a predetermined second number of bits, the second number of bits being less than the first number of bits.

17. An adaptive dynamic range compression apparatus, comprising:

(a) a high frequency boost circuit that receives an input image comprising a plurality of input pixels, each of the input pixels being represented by a pixel value having a first predetermined first number of bits, the high frequency boost circuit producing an output image comprising a plurality of output pixels as a function of:

(i) a first local operator convolving each input pixel and its neighbors in a surround region of the input image with a local distribution to produce surround pixel values with enhanced high frequency content, the surround region having a surround area larger than the area of a single input pixel, (ii) a second local operator processing each input pixel and its neighbors in a normalization region of the input image with a first statistical function to produce global adaptive scene measures for each input pixel that measure an adaptive scene characteristic, the normalization region having a normalization area larger than the surround area, but smaller than the entire image, and (iii) a third local operator that adaptively normalizes the surround pixel values based on the global adaptive scene measures for each input pixel to produce the output image; and (b) a dynamic range mapping circuit that receives the output image produced by the high frequency boost circuit and based on a second statistical function of pixel values in the entire image maps the output image to a target image comprising a plurality of target pixels, each of the target pixels being represented by a pixel value having a predetermined second number of bits, the second number of bits being less than the first number of bits.

18. The apparatus of claim 17, wherein the local distribution is a Gaussian distribution.

19. The apparatus of claim 17, wherein the first statistical function is the adaptive mean of pixel values in the normalization region of the input image and the second statistical function is the global mean of pixel values in the entire image.

20. The apparatus of claim 17, further comprising:

a fourth local operator convolves each pixel of the image and a center region of the image around each pixel with the local high frequency boost operator to produce a center pixel value, said operator differencing the center and surround pixel values to form a processed pixel value and summing the center pixel value and global adaptive scene measure to form a normalization value, said third local operator adaptively normalizing the processed pixel values based on the normalization values for each input pixel to produce the output image.

* * * * *